July 3, 1956 A. W. VINCENT 2,753,400

AUTOMATIC TELEPHONE SYSTEM

Filed Dec. 15, 1952 4 Sheets-Sheet 1

INVENTOR.
ANDREW W. VINCENT

BY D. Clyde Jones

ATTORNEY

INVENTOR.
ANDREW W. VINCENT
BY D. Clyde Jones
ATTORNEY

July 3, 1956 A. W. VINCENT 2,753,400

AUTOMATIC TELEPHONE SYSTEM

Filed Dec. 15, 1952 4 Sheets-Sheet 3

INVENTOR.
ANDREW W. VINCENT
BY D. Clyde Jones
ATTORNEY

July 3, 1956 A. W. VINCENT 2,753,400

AUTOMATIC TELEPHONE SYSTEM

Filed Dec. 15, 1952 4 Sheets-Sheet 4

INVENTOR.
ANDREW W. VINCENT
BY D. Clyde Jones
ATTORNEY

United States Patent Office
2,753,400
Patented July 3, 1956

2,753,400

AUTOMATIC TELEPHONE SYSTEM

Andrew W. Vincent, Rochester, N. Y.

Application December 15, 1952, Serial No. 326,112
13 Claims. (Cl. 179—18)

This invention relates to an automatic telephone system.

The invention has for its purpose the provision of an automatic telephone system in which relatively inexpensive cold cathode tubes replace many expensive relays used in conventional systems and yet afford rapid and reliable operation.

Figure 1:
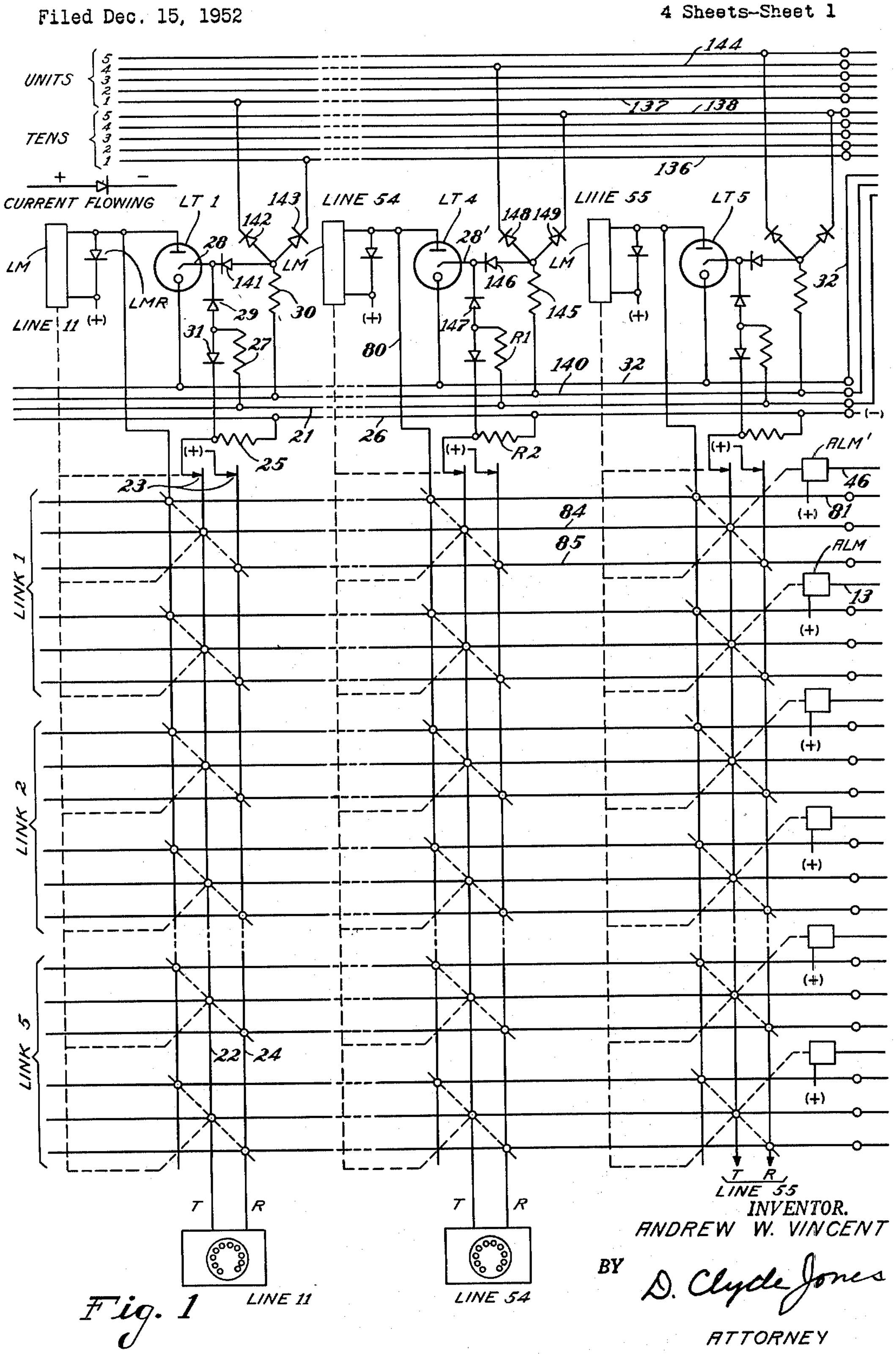
Figure 2:
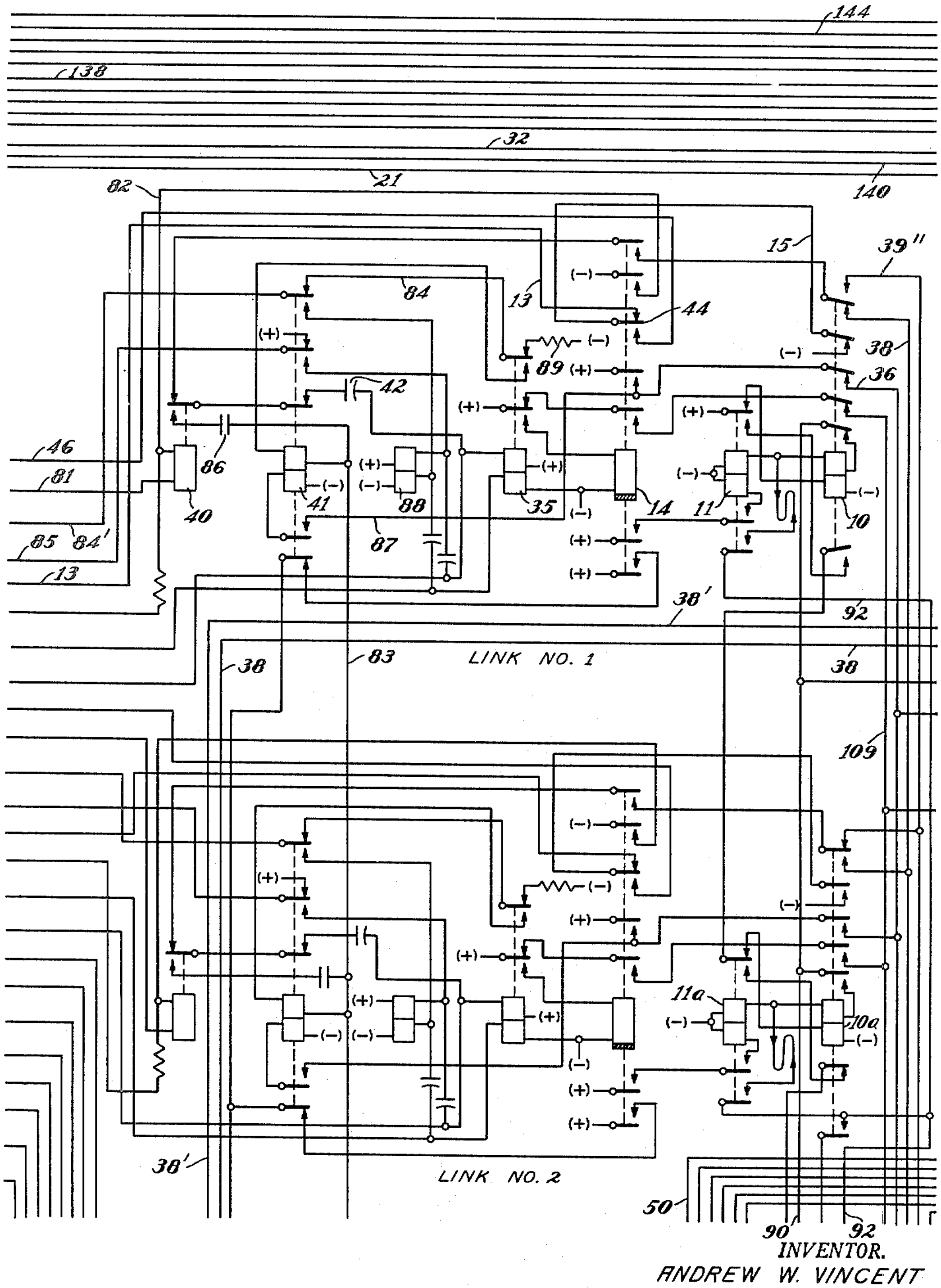
Figure 3:
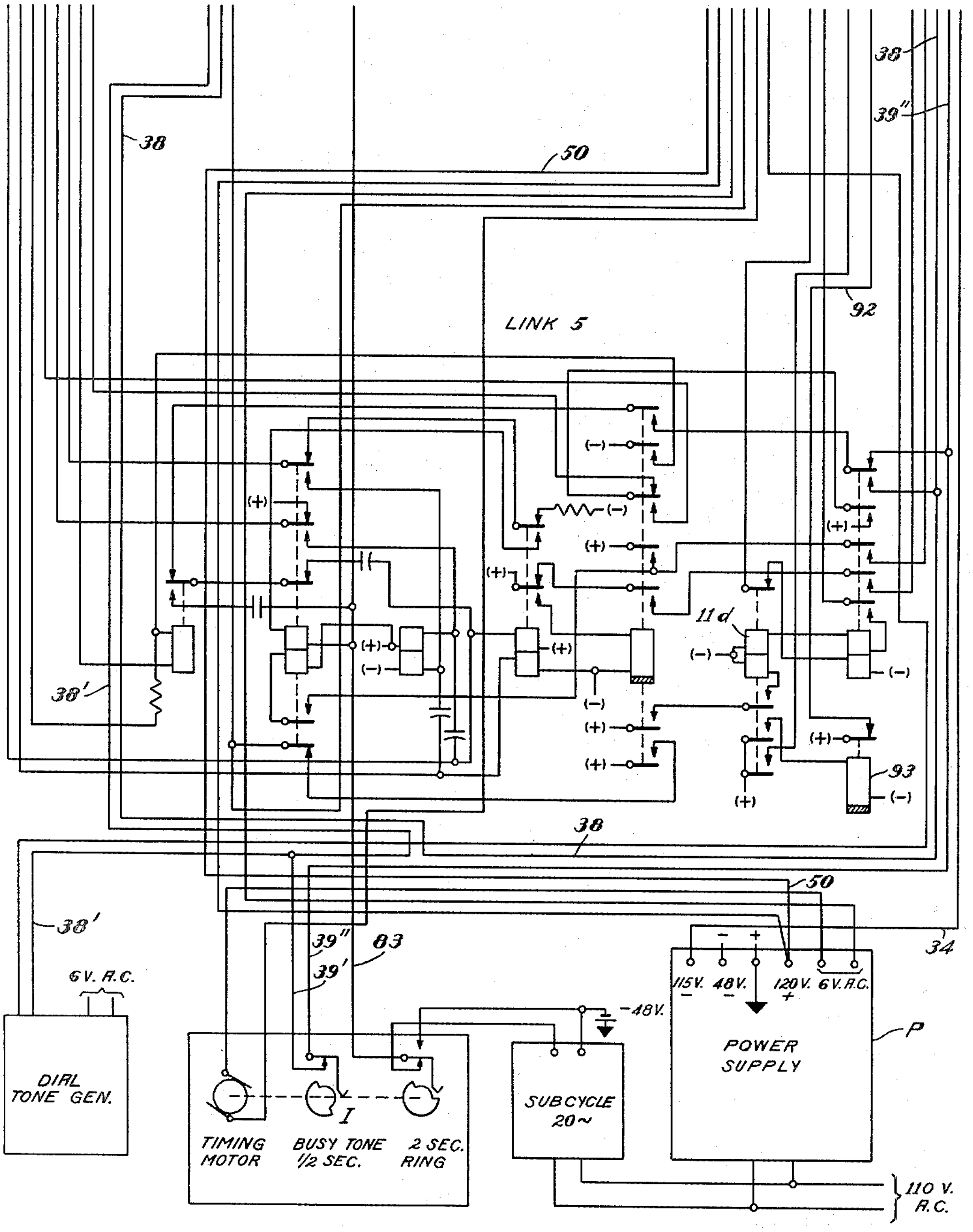
Figure 4:
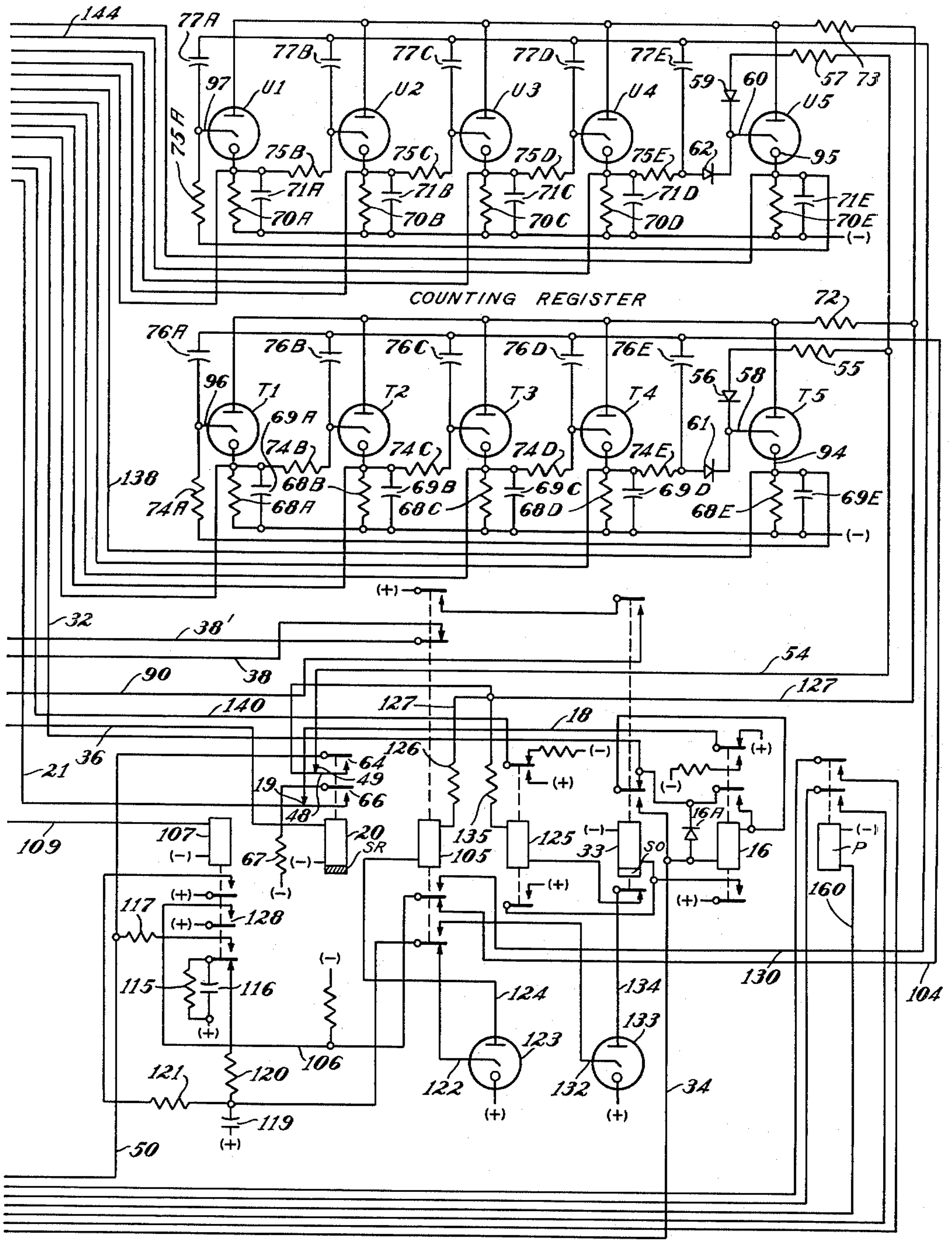

The various features and advantages of the invention will appear from the detailed description and claims when taken with the drawings wherein Figs. 1, 2 and 4 are arranged side by side in the order named and when Fig. 3 is placed below Fig. 2 in matching relation, represent an automatic telephone system.

The system herein disclosed makes use of a cross-bar switch of the type disclosed in applicant's co-pending application Serial No. 261,673, filed December 14, 1951, although this system is adapted for use with other types of switches.

It is believed that the invention will best be understood by describing the operations involved in connecting a calling telephone line, such as #11, to a called telephone line such as line #54. While the system is in service some one of the links for example link #1, is allotted for use. This is brought about by the operation of allotter relay 10 (Fig. 2), this relay being operated from (—) battery, its lower winding, upper back contact and armature of the relay 11, to (+) battery. The operation of the allotter relay 10 effects the operation of the finder allotter magnet ALM (Fig. 1) of the #1 link, in a circuit traceable from grounded battery, winding of this magnet, conductor 13, middle back contact and armature of the relay 14, conductor 15, armature and front contact of the allotter relay 10, to (—) battery. This prepares the cross-bar switch to connect the calling telephone line #11, on the initiation of a call thereon, to the allotted #1 link. The cathode relay 16 (Fig. 4) applies positive or ground potential to the line trigger lead 21 from grounded battery, uppermost, back contact and armature of this relay, conductor 18 through the make before break contacts 19 of the slow releasing, register control relay 20, line trigger conductor 21, which is common to the individual call initiating equipment of all of the lines of the system. Thus it prepares for the time when a telephone line such as #11 initiates a call. On the initiation of this call +48 volt battery is supplied through one set of the cutoff contacts 23 to the ring side 24 of this calling telephone line and thence in series with the tip side thereof, through the other set of cut-off contacts 23 and the resistor 25, conductor 26, to —48 volt battery. The magnitude of the line load resistance determines the voltage drop across the resistance 25. A positive line trigger voltage is applied, as above described, over the line trigger lead 21, resistor 27, through the rectifier 29, to the control anode 28 of the cold cathode tube LT1 which is individual to the calling line. The potential applied to the control anode 28 is determined by the voltage drop across the resistance 25. The value of the resistor 27 is much greater than the value of the resistor 25 and therefore has little effect on the voltage drop across resistor 25. The rectifier 141 blocks the voltage from resistor 30, that is, it prevents current from flowing into resistor 30 with the consequent loss of voltage. When the line trigger voltage on lead 21 is negative, no current is supplied to the control anodes similar to 28 at any of the cold cathode tubes individual to any of the telephone lines, since the rectifier 31 blocks the voltage across resistor 25.

When circuits over a telephone line such as line #11 or other telephone lines are completed by the removal of the handset at the substation or stations on these respective lines, the control anodes such as 28 of the cold cathode tubes of the several lines, may be simultaneously increased to the firing potential of the tube or tubes in which case the breakdown is transferred to the anodes of the several tubes in a finite time. As this transfer takes place the current drawn, causes a rapid rise in the potential at the cathodes of all of the tubes, these tubes being connected over the cathode circuit 32, through the back contact and armature of relay 33, winding of the cathode relay 16 (Fig. 4), conductor 34, to a source of battery at —115 volts. As the potential of the cathodes rapidly increases, one cold cathode tube is fired but the remaining cold cathode tubes are extinguished.

The rising voltage at the cathodes of the several tubes, extinguishes all of these tubes but one, and thus prevents the simultaneous seizure, that is, the connection of several simultaneously calling lines to the same link. The cathode current through the cathode relay 16 transfers by the operation of this relay the line trigger circuit including conductors 18 and 21, from the positive pole of battery to the negative pole of battery, thereby preventing a subsequent operation of the other cold cathode tubes of the waiting lines until the telephone line #11 has extended its call. The operation of the cathode relay 16, operates the slow-operating timing relay 33 in an obvious circuit completed at the inner lower, front contact of the relay 16. The operation of the timing relay 33, short-circuits the winding of the cathode relay 16 thereby causing this last-named relay to release slowly.

Upon the release of the cathode relay 16, the cathode tube circuit 32 is opened, thereby extinguishing the line tube LT1 (Fig. 1). The release of the cathode relay 16 also causes the release of the timing relay 33, to complete the cycle of operation of these two relays which takes place in the course of the origination of a call and also in the course of the completion of a call. The short-circuiting of the relay 16 reduces the resistance in the cathode circuit 32 sufficiently to increase the current in the line magnet LM (Fig. 1) of the calling line, causing it to operate. The operation of this line magnet LM disconnects this line from its line equipment at the cut-off contacts 23 of the cross-bar switch, and connects the line in series with the winding of the calling battery feed relay 35 (Fig. 2) through the respective line contacts and the bar contacts of the allotted link #1. The relay 35 in turn operates the slow releasing relay 14, in an obvious circuit completed through the front contact and armature of relay 35. Relay 14 establishes a holding circuit to maintain the line magnet LM energized before the cathode relay 16 extinguishes the line tube LT1. The relay 14 also energizes the register control relay 20 by establishing a path from ground through the allotter relay 10 in a circuit traceable from upper armature and front contact of relay 14, through the upper armature and front contact of relay 10, conductor 36, winding of relay 20, to negative battery.

The operation of the slow-releasing relay 14 also connects dial tone from the tone generator (Fig. 3), conductor 38′, armature and back contact of relay 105 (Fig. 4), conductor 38, front contact and uppermost armature of the allotter relay 10, front contact and armature of the relay 14, back contact and armature of the busy test relay 40, armature and back contact of the ringing trip relay 41 through the capacitor 42, through the upper winding of the calling battery feed relay 35 to ground. This circuit induces the dial tone in the lower winding of the relay 35, and through the tip and ring conductors of the #1 link and through the corresponding conductors of the telephone line of the calling subscriber #11, thereby indicating to him that the equipment is in readiness to receive dial impulses corresponding to the wanted line #54.

The relay 14 at its armature 44 and back contact, interrupts the operating circuit of the finder allotter magnet ALM and operates the connector allotter magnet ALM' of the allotted link #1. The connector allotter magnet ALM' is operated from ground, winding of this magnet, conductor 46, front contact and armature of relay 14, conductor 15, front contact and armature of the #1 allotter relay 10, to (—) battery. This prepares the cross-bar switch to make connection from the selected link #1, to the called telephone line as will be described.

The calling subscriber now operates his dial to transmit five impulses corresponding to the tens digit of the called line and then transmits four units impulses corresponding to the units digit of the called line #54. While the above operations are taking place, the register control relay 20 (Fig. 4) is operated, as described above, to prepare the impulse counting register for receiving the impulses corresponding to the number designation of the called line. The uppermost contact 49 of the make-before-break combination of the relay 20 momentarily supplies a pulse of control voltage to the control anode of the tens cold cathode tube and to the control anode of the units cold cathode tube U5, of the tens and units series of counting cold cathode tubes, respectively. This control voltage is supplied from the +120 volt tap of the power supply P (Fig. 3), conductor 50, through the armature and the momentarily made contacts 49 of relay 20, conductor 54, through resistor 55, rectifier 56 and control anode 58 of tube T5. Also in multiple therewith from conductor 54 through resistor 57, rectifier 59, control anode 60 of units tube U5. This voltage causes the tubes T5 and U5 to break down and thereby pass current. However the rectifier 61 blocks the momentary pulse from being applied to the control anodes of tubes T1, T2, T3 and T4 to prevent firing thereof at this time. Likewise the rectifier 62 functions in like manner to block the momentary pulse from operating the tubes U1, U2, U3, and U4. The closure of the contact 66 of the lower make before break combination of the relay 20, connects —48 volt battery through resistance 67, through contact 66, to the line trigger circuit 21 without allowing this circuit to go positive before the relay 16 releases. If the relay 16 is released before the relay 20 operates, as just described, it could activate the incoming line circuits so that it could be possible for a second calling telephone line also to become connected to the same link circuit #1.

The cathodes of the tens counting tubes and of the units counting tubes are individually connected through a parallel resistor 68A, 68B, etc. and 70A, 70B, etc., respectively and a capacitor 69A, 69B etc. and 71A, 71B, etc., respectively, to the negative terminal of the 48 volt battery supply. The anodes of the tens counting tubes are connected to the power supply through the resistance 72 while the anodes of the units counting tubes are connected to the power supply through the resistor 73. The control anode of each of the counter tubes are connected in each case to the cathode of the preceding tube through a high resistance such as 74A on the tens counter tubes and 75A on the units counter tubes. The control anodes of the tens counting tubes are connected through capacitors 76A, 76B, 76C, 76D and 76E to a pulse circuit 104 which is common to the tens counting tubes. The control anodes of the units counting tubes are similarly connected, through capacitors 77A, 77B, 77C, 77D and 77E, to a second pulse circuit 130 in like manner. Since the tens counter tube T5 and the units counter tube U5 have been triggered or fired, current flows through these tubes causing a voltage drop across the cathode resistors and capacitors 68E and 70E as well as 69E and 71E, respectively. Since the cathode 94 of the tens counter tube and the cathode 95 of the units counter tube are at plus potential with respect to the cathodes of the remaining tens counter tubes and the units counter tubes, the control anode of the tens counter tube T1 and the units counter tube U1 are increased to a potential value which is positive with respect to the other tubes but not sufficient to fire these tubes by the charging of the capacitor 76A through the resistor 74A or through the charging of the capacitor 77A through the resistor 75A. The tens counter tubes are now in a condition to step the operation of the #5 tens counter tube to the #1 tens counter tube T1 and in like manner to tubes T2, T3, T4 and T5, in response to succeeding pulses generated at the dial of the calling line. The circuit for the common capacitors 76A, 76B, 76C, 76D and 76E extends over conductor 104 through the armature and back contact of the primary transfer relay 105, conductor 106, armature and front contact 128 of the pulse repeat relay 107, to ground. When the dial at the calling station is released to effect the timed interruptions of the circuit of the calling battery feed relay 35, the first restoration of the circuit of this relay, effects the operation of the pulse repeat relay 107, from negative battery, winding of this relay, over conductor 109, front contact and armature of the #1 allotter relay 10, front contact and armature of the slow-releasing relay 14, upper back contact and armature of the relay 35 to ground. When the pulse repeat relay 107 is operated, the control anodes of the tens counter tubes are increased in potential and since the control anode of the T1 counter tube is higher than that of the remaining tubes in this series, the T1 counter tube fires, whereas the counter tubes T2, T3 and T4 do not. Inasmuch as the charge across the capacitor 69A is zero at zero time, the anode of the tube T1 is lowered to +65 volts which is the voltage drop across this tube. The remainder of the supply voltage appears across resistor 72. Since the cathode of the tube T5 is at a positive potential of 50 volts and its anode is at a potential of 65 volts, because it is connected to the anode of the control tube $T_1$, the voltage across the tube T5 is 15 volts which is insufficient to maintain the discharge across this tube and it is extinguished. The break-down of the Tube T5 is thus transferred to the tube T1 and in turn to the succeeding tubes T2, T3, T4, and T5, in response to the remainder of the tens series of dial impulses.

When the dial at the calling station returns to its rest position after transmitting the series of five tens impulses, corresponding to the tens digit #5 of the called line, and the consequent operation of the tens counting tubes as above described, there is a pause before the units digit #4 can be dialed. This pause is a longer interval than the time between the successive pulses in the tens pulse train. During this long interval the primary transfer relay 105 is operated and thereby transfers the pulse circuit associated with the pulse relay 107 from the tens counter tubes, to the units counter tubes.

It should be pointed out how the primary transfer relay 105 remains inoperative during the transmission of tens series of dial impulses and how this relay operates only at the close of the tens series of impulses. When the pulse relay 107 operates in response to the first impulse of the tens series, the resistance-capacity or RC network comprising the resistor 115 and the capacitor 116 are connected in multiple in a circuit from grounded battery, armature and front contact of pulse relay 107, resistor 117, conductor 50 to the +120 volt terminal of the power supply. This circuit charges the capacitor 116 to substantially the mentioned voltage of the power source. However, the relation of the values of the resistor 120 and capacitor 119 are such that on each release of the pulse relay 107 during the series of impulses, the capacitor 119 is charged to a portion of the voltage in the capacitor 116. However when the pulse relay 107 is again energized on the next pulse of the series, so that its armature and front contact connects the resistor 121 to ground, the capacitor 116 is completely discharged. Consequently, the capacitor 119 does not accumulate a charge equal to the charge accumulated in the condenser 116 until the pulse relay is held deenergized for a period greater than the interval between the individual pulses of a series. Therefore, at the pause between two series of impulses the condenser 119 will be charged nearly to the voltage of the condenser 116. As a result of this increased voltage on the condenser 119, a firing voltage is applied to the control electrode 122 of the primary transfer tube 123. This condition causes the transfer tube 123 to fire, thereby permitting current to flow from the negative pole of battery across the space between the cathode and anode of this tube, conductor 124, winding of the primary transfer relay 105, resistor 126, conductor 127, contacts of relay 20, conductor 50, to the +120 volt source. The primary transfer relay is energized in this circuit and thereby transfers the circuit for repeating impulses by the pulse relay 107 from the tens counter tubes to the units counter tubes. Thus when the pulse relay 107 releases in response to each of the units series of impulses, a circuit will be completed from ground, armature 128 and front contact of the pulse relay, conductor 106, armature and front contact of the primary transfer relay 105, conductor 130 to the units counting tubes. In response to each of the impulses repeated by the pulse relay 107, which in the case assumed is four, all of the first four of the series of units counting tubes, will be operated and released in succession until tube U4 is operated. During the transmission of the units series of impulses, the RC combination comprising the capacitor 116 and resistor 115 will cooperate with the RC combination comprising the resistor 120 and capacitor 119, in the manner previously described. Thus at the close of the units series of impulses, the capacitor 119 will accumulate a voltage approximately equal to that of condenser 116. This voltage is now applied through the armature and front contact of the primary transfer relay 105 to the control electrode 132 of the secondary transfer tube 133, causing this tube to fire. When this tube fires it completes a circuit through the conductor 134, armature and back contact of primary cathode relay 33, winding of the secondary transfer relay 125, resistor 135, through the contacts of relay 20, conductor 50, to the +120 volt source. Transfer relay 125 is energized in this circuit, indicating that the tens and units series of impulses have been transferred to the tens and units counter tubes thereby storing the impulses corresponding to the called line, namely, #54. When the secondary transfer relay 125 is energized it activates the register trigger circuit 140 by transferring this circuit from minus to plus potential.

The cathode circuits of the units counter tubes and the tens counter tubes are extended in multiple array to the line circuits where they are connected in decimal combination to the control anodes of the line tube LT1, LT4, LT5 through the selenium rectifiers 141, 142 and 143. For example, the control anode 28 of the calling line tube is connected over the #1 tens conductor 136 to the cathode of the #1 tens counting tube T1 and over #1 units conductor 137 to the cathode of the units counting tube U1. It will be noted that the control anode of the line tube associated with line #54 is connected to the tens conductor 138 leading to the #5 tens counting tube T5, and is connected over the #4 units conductor 144 leading to the cathode of the #4 units counting tube U4.

When the register trigger circuit 140 is made positive at the armature and front contact of the secondary transfer relay 125, current is supplied to the control anode of one of the twenty-five line tubes LT as determined by the counter tubes, which in this instance is the #54 line tube, through the resistor 145 and rectifier 146. The rectifier 147 blocks out the calling line circuits also connected to this control anode. The counter tubes mark the called line in the following manner. The rectifiers such as 148 and 149 of each line are connected to the digits conductors of the particular called line for example #54, and either rectifier 148 or 149 will conduct current from the register trigger circuit 140 through resistor 145 (Fig. 1) through conductor 144 and the cathode resistor 70D (Fig. 4) or through conductor 138 and resistor 68E, to the negative supply. When the cathode of either tube T5 or tube U4 is not made positive by conduction, the negative drop across resistor 145 prevents the control anode voltage at any line tube from increasing to breakdown potential unless both cathodes to which 148 and 149 are connected, are positive. When the cold cathode tube LT4 of the called line is thus fired, the primary cathode relay 16 (Fig. 4) is energized in a circuit from the −150 volt terminal of the power supply, conductor 34, winding of relay 16, armature and back contact of the relay 33, conductor 32, through the fired cold cathode tube LT4 of the called line, winding of the line magnet LM, of the called line, to ground. As soon as the relay 16 is energized in the circuit just described, it completes an obvious circuit for energizing the slow-releasing cathode relay 33. When the relay 16 operates the slow-releasing relay 33, this last-named relay short-circuits the winding of the relay 16 causing this relay to release slowly. Upon the release of the relay 16, the cathode tube circuit 32 is opened, thereby extinguishing the line tube of the called line. When relay 16 releases, it also causes the slow-releasing relay 33 to release. The release of relay 33 again closes the cathode circuit through the winding of relay 16. This completes the cycle of operation of the relays 16 and 33. The short-circuiting of the relay 16 reduces the resistance in the tube circuit sufficiently to increase the current in the line magnet LM4 of the called line causing it to operate. The operation of this line magnet disconnects the called line equipment from its line circuit at the cut-off contacts such as 23 of the called line. The called line is connected through to the connector portion of the #1 link if the called line is idle. At this time, the next idle link in the series is allotted for use, irrespective of whether the called line is busy or idle as will be described. The line magnet LM4 is now held operated over conductors 80 and 81, winding of the busy test relay 40, conductor 82, the upper front contact and armature of relay 14, to negative battery. The busy test relay 40 is also operated in this circuit.

Interrupted ringing current is now supplied to the called line, from the ringing current lead 83 (Fig. 3), upper winding of the ringing trip relay 41, uppermost front contact and armature of relay 35, conductor 84, back contact and armature of relay 41, conductor 84', closed contact of the cross bar switch, tip side T of the called line, through the ringer at the called substation, ring side R of the called line, through the contacts of the cross-bar switch, conductor 85, upper armature and back contact of the trip relay 41, to positive battery. Revertive ringing tone current, which informs the calling subscriber that the called party is being rung, is simultaneously induced in the calling battery-feed relay 35 and thence over the calling line, in a circuit including ringing current lead 83, condenser 86, front contact and armature of busy test relay 40, armature and back contact of trip relay 41, condenser 42, upper winding of relay 35, to positive battery.

When the called subscriber at substation #54 answers, the ringing trip relay 41 operates, and locks itself operated through its lower winding, its lower armature and front contact, conductor 87, front contact and armature of slow-releasing relay 14, to positive battery. The operation of trip relay 41, extends the tip and ring conductors T and R of the called line and the link conductors 84 and 85 serially connected thereto, through the upper armatures and front contacts of relay 41, through the upper and lower windings of the answering bridge relay 88, to the positive and negative poles of battery respectively.

Talking battery is supplied to the called line through the windings of relay 88, as just described while talking battery is supplied to the calling line through the wndings of relay 35.

At the close of the conversation when the calling subscriber replaces his receiver on his switch-hook, the circuit of relay 35 is interrupted causing this relay to release. The release of relay 35 in turn causes the release of the slow-releasing relay 14. Relay 14 on releasing, interrupts the hold circuit that has maintained operated, the portion of the crossbar switch used in present connection, causing this portion of the switch to be restored to normal.

However, if the called line is busy, the application of positive voltage to the control anode of the cold cathode tube of the called line, causes a breakdown between the control anode and the cathode in the tube. However the breakdown is not transferred to the main anode inasmuch as it is being held sufficiently negative by the line magnet hold circuit which prevents breakdown. Since the line magnet hold circuit is not established when the line is busy, the busy test relay 40 does not operate. In that case busy tone is supplied to the calling line through the armature and back contact of the busy test relay 40, in a circuit extending from the vacuum tube type tone generator (Fig. 3), conductors 38′ and 39′, interrupter I, conductor 39″, back contact and armature of allotter relay 10, armature and front contact of relay 14, back contact and armature of busy test relay 40, armature and back contact of ringing relay 41, capacitor 42, through the upper winding of relay 35, to positive battery. Tone current in the upper winding of relay 35, is induced into the lower winding thereof which is connected to the calling line and the substation thereon, to give a busy signal.

If the calling party abandons the call by hanging up before the called party has answered, the release of the line magnet LM4 of the called line, disconnects the called line from connector portion of the seized link. The called line is then reconnected to its line equipment when the cut-off contacts, such as 23, close. The voltage charge on the called line as a result of the ringing voltage thereon, would be sufficient to falsely fire the line tube LT4, if the ringing voltage is on the connector end of the link when the release occurs and if the release occurs during a certain part of the ringing cycle. For this reason it is necessary in the link to disconnect the ringing voltage from the line and to connect the line to a direct current voltage, for a short period before the line is released. This allows the line to charge to a potential which will not disturb the line equipment when it is reconnected to the line circuit. The calling battery feed relay 35, is used to effect this result since relay 35 releases the slow releasing relay 14 and relay 14 in turn releases the link in use. It will be recalled that ringing current is supplied to the connector end of the link through the upper armature and front contact of relay 35 and through the armature and back contact of the ringing trip relay 41. When the calling party hangs up, the relay 35 releases thereby disconnecting ringing current and connecting at its armature and back contact, negative voltage to the called line through a protective resistor 89. The time interval which transpires before the crossbar switch releases, is sufficient to charge the called line to the same voltage which is impressed upon it by its line equipment, so that no disturbance is caused in the line equipment when release occurs.

It was mentioned above that at the close of the units series of impulses, the next idle link in the series is alloted for use in extending a second call irrespective of whether or not the called line #54 is busy or idle. At the end of the mentioned units series of impulses the secondary transfer relay 125 is energized as above described. Relay 125 in turn energizes the slow-operating relay 33 in a circuit from negative battery, winding of this relay, lower armature and front contact of relay 125 to positive battery. When relay 33 is thus operated it operates the relay 11 of the allotter relay chain (Fig. 2) in a circuit from negative battery, upper winding of relay 11, upper winding, front contact and armature of relay 10, conductor 90, front contact and upper armature of relay 33, front contact and armature of relay 105 to positive battery. Also when the relay 33 operates it interrupts at its lower armature and back contact, the operating circuit of the relay 125. Relay 125 on releasing restores the negative register trigger potential on conductor 140. The release of relay 125 after a predetermined lapse of time effects the release of the slow-operating relay 33. The release of relay 33 in turn interrupts the previously described circuit including conductor 90 which causes the allotter relay 10 to release. However, the allotter relay 11 is locked operated through its lower winding, its lower front contact and armature, front contact and armature of slow-releasing relay 14, to positive battery. Since the allotter step circuit including the conductor 90, is in series with the front contact and armature of the primary transfer relay 105 and since relay 105 is not operated during the origination of calls, the operation of relay 33 does not step the alloter relay chain at this time. The release of the allotter relay 10 operates the next idle allotter relay in the series such as 10*a*, etc., which relay operates the finder link allotter magnet of the newly allotted link. The relay such as 10*a* is energized from negative battery, lower winding of the relay 10*a*, upper back contact and armature of relay 11*a*, lower armature and back contact of relay 10, front contact and armature of relay 11 to the positive pole of battery. It will be noted that the relay 11 of the link is locked operated at the front contact and armature of the slow-releasing relay 14 of the link, as long as the link is in use. However the relay 11 is still locked operated after relay 14 releases, until all of the links in the series have been used. This last locking circuit is traceable from negative battery, upper winding of relay 11, through the non-inductive resistance, lowermost front contact and armature of relay 11, conductor 92, to ground at the back contact and armature of relay 93. The release of the allotter relay 10 also releases the connector link magnet ALM′ and the register control relay 20 which is the last relay to release before a succeeding call is extended. Relay 20 restores the line trigger circuit including conductors 21 and 18, to positive potential and removes the supply voltage applied over conductor 50 to the counter tubes and the transfer relay 105 and its related tube 123. The system is now ready to receive an incoming call into the next idle link. It will be noted that the links of the series are alloted in succession, if idle. This is brought about since each relay such as 11 of the link is locked operated and remains locked until all allotter relays in the series have been operated whereupon the slow-releasing relay 93 is operated at the front contact and armature of the relay 11*d* which is the last of the series, to interrupt the locking circuit of the relays 11, 11*a*, etc., causing these relays to release. Then the first allotter relay 10 of the #1 link is operated and the cycle of allotting links, is repeated. This assures uniform wear on all of the equipment.

It should be pointed out that when the line magnets LM are released at the completion of a call the collapse of the magnet flux produces a positive voltage at the anode of the line tube LT which is short-circuited by the rectifier LMR. If this rectifier were not connected across the coil of the line magnet the voltage would rise to a point where the line tube would break down from the anode to cathode and falsely operate the line magnet LM and the cathode relay 16 (Fig. 4).

The rectifier 16A across the cathode relay functions in a similar manner to prevent false breakdown of the line tube LT from the cathode to the control anode. When the cathode relay 16 releases, it opens the line tube cathode circuit and extinguishes the line tube; the relay 33 is also released. The release of relay 33 removes the short-circuit across relay 16 and reconnects relay 16 to the cathode circuit of the line tube. The removal of the short-circuit on relay 16 produces a negative voltage pulse due to the collapse of the remaining flux, which when connected to the cathode of the line tube, may cause any one of the line tubes to fire. The rectifier prevents the voltage across relay 16 from going negative and thus prevent false operation of the line tubes.

What I claim is:

1. In an impulse transmitting and receiving system, means for generating in succession a first and a second series of electrical impulses with a pause of a given duration between the successive impulses of each series and with a pause between the two series of longer duration than the duration of each of said first mentioned pauses, an impulse relay responsive to each impulse of each series of impulses for repeating the same, a first impulse receiving unit individual to the first series of impulses, a second impulse receiving unit individual to the second series of impulses, means including a switching relay for communicating in succession the first series of repeated impulses to the first unit and the second series of repeated impulses to the second unit, and means including a resistance-capacity integrating electrical network charged during said longer pause for operating said switching relay, said last named means being ineffective to charge said network to operate said switching relay during a pause preceding the generation of the first impulse of the first series.

2. In an impulse transmitting and receiving system, means for generating in succession a first and a second series of electrical impulses with a pause of a given duration between the successive impulses of each series and with a pause between the two series of longer duration than the duration of each of said first mentioned pauses, an impulse relay responsive to each impulse of each series for repeating the same, a first impulse receiving unit individual to the first series of impulses, a second impulse receiving unit individual to the second series of impulses, means including multi-posiiton switching means successively communicating the first series of repeated impulses to the first receiving unit and for communicating the second series of repeated impulses to the second receiving unit, and means including a first resistance-capacity, electrical network responsive to the first impulse of a series and a second resistance-capacity network charged from said first network during the longer pause at the close of a series of impulses for operating said multi-position switching means from one position to a second position.

3. In an impulse transmitting and receiving system, means for generating in succession a first and a second series of electrical impulses with a pause of a given duration between the successive impulses of each series and with a pause between the two series of longer duration than the duration of said first mentioned pauses, an impulse repeating relay responsive to each impulse of each series for repeating the same, a first impulse receiving unit individual to the first series of impulses, a second impulse receiving unit individual to the second series of impulses, means including switching means successively communicating the first series of repeated impulses to the first receiving unit and the second series of repeated impulses to the second receiving unit, means including a first resistance-capacity, electrical network responsive to the first impulse of a series and a second resistance-capacity network operatively connected to said first network during the longer pause at the close of a series, an electrical discharge device actuated jointly by both of said networks, and an operating circuit for said switching means completed by said discharge device.

4. In an impulse transmitting and receiving system, means for generating in succession a first and a second series of electrical impulses with a pulse of a given duration between the successive impulses of each series and with a pause between the two series of longer duration than the duration of each of said first mentioned pauses, an impulse relay responsive to each impulse of each series for repeating the same, a first impulse receiving unit individual to the first series of impulses, a second impulse receiving unit individual to the second series of impulses, means including multiposition switching means successively communicating the first series of repeated impulses to the first receiving unit and the second series of repeated impulses to the second receiving unit, means including a first resistance-capacity electrical network responsive to the first impulse of a series and a second resistance-capacity network operatively connected to said first network during all of said pauses and becoming charged to a predetermined potential from said first network only during the longer pause at the close of a series, a discharge tube comprising a cold cathode, a control element and an anode, an operating circuit for the switching means including said cathode and said anode, and means including said networks for applying a firing potential to said control electrode when said second network becomes charged to said predetermined potential during said longer pause.

5. In a telephone system, a group of telephone lines, a cold cathode tube individual to each line of the group, each tube comprising a cathode, a control anode and a main anode, a conductor connected in multiple to the cathodes of said group of tubes, means normally maintaining said conductor at a given negative polarity, means maintaining said main anode at a positive difference of potential with respect to its related cathode, the difference of potential between said main anode and said cathode being such that said tube will not fire, means controlled over a telephone line when initiating a call thereover for establishing at said control anode a difference of potential with respect to its cathode such that said tube becomes conducting, an anode circuit including said main anode, a magnet individual to a telephone line and connected in said anode circuit and adapted to be operated when said tube becomes conducting, and means controlled by said magnet for extending its telephone line.

6. In a telephone system, a group of telephone lines, a cold cathode tube individual to each line of the group, each tube comprising a cathode, a control anode and a main anode, a conductor connected in multiple to the cathodes of said group of tubes, means normally maintaining said conductor at a given negative polarity, means maintaining said main anode at a positive difference of potential with respect to its related cathode, the difference of potential between said main anode and said cathode being such that said tube will not fire, means controlled over a telephone line when initiating a call thereover for establishing at said control anode a difference of potential with respect to its cathode such that said tube becomes conducting, an anode circuit including said main anode, a magnet individual to a telephone line and connected in said anode circuit and adapted to be operated when said tube becomes conducting, and means limiting the cold cathode tubes of simultaneously calling lines to sequential operation.

7. In a telephone system, a group of telephone lines, a cold cathode tube individual to each line of the group, each tube comprising a cathode, a control anode and a main anode, a conductor connected in multiple to the cathodes of said group of tubes, means normally maintaining said conductor at a given negative polarity, means maintaining said main anode at a positive difference of potential with respect to its related cathode, the difference in potential between said main anode and said cathode being such that said tube will not fire, means controlled over a telephone line when initiating a call thereover for establishing at said control anode a difference of potential with respect to its cathode such that said tube becomes conducting, an anode circuit including said main anode, a magnet individual to a telephone line and connected in said anode circuit and adapted to be operated when said tube becomes conducting, links for extending said telephone lines, means controlled by said magnet for extending its telephone line to a link, and means controlled over said link for maintaining said magnet operated.

8. In an automatic telephone system, telephone lines, switching means and links for interconnecting said telephone lines, marking means individual to each telephone line for causing said switching means to connect a link to a given telephone line on the initiation of a call thereover and to connect a link to said given telephone line when called, impulse-actuated means for designating a telephone line as a called line, said marking means including a cold cathode tube comprising a cathode, a control anode and a main anode, sources of potential respective applied to said cathode and said main anode normally maintaining said tube non-conducting, first starting means controlled over said given telephone line when calling to apply an igniting potential to the control anode thereof, second starting means including said impulse-actuated means to apply an igniting potential to said control anode when its given line is called, and means preventing the simultaneous operation of both of said starting means.

9. In a telephone system, a plurality of telephone lines each identified by a different decimal notation from each of the others, a plurality of links, switching means and at least one of said links for interconnecting said telephone lines, marking means individual to each telephone line controlling said switching means, said marking means comprising an ionically operated tube including a cathode, a control anode and a main anode, means controlled over a telephone line when originating a call for applying a starting potential to the control anode of the tube in the marking means thereof, impulse-actuated means including ionically actuated devices operated responsive to impulses corresponding to the decimal notations of any wanted one of said telephone lines, a group of tens conductors each individual to a tens digit, a group of units conductors each individual to a units digit, the conductors corresponding to the tens and units digits of a given telephone line being connected to the control anode of the tube individual to the given line and means including the operated impulse actuated devices as well as the tens and units conductors of the wanted telephone line for applying a starting potential to the control anode of the tube in the marking means thereof.

10. In a telephone system, a plurality of telephone lines each identified by a different decimal notation from each of the others, a plurality of links, switching means and at least one of said links for interconnecting said telephone lines, marking means individual to each telephone line controlling said switching means, said marking means comprising an ionically operated tube including a cathode, a control anode and a main anode, means controlled over a telephone line when originating a call for applying a starting potential to the control anode of the tube in the marking means thereof, impulse-actuated means including ionically actuated devices operated responsive to impulses corresponding to the decimal notations of any wanted one of said telephone lines, a group of tens conductors each individual to a tens digit, a group of units conductors each individual to a units digit, the conductors corresponding to the tens and units digits of a given telephone line being connected to the control anode of the tube individual to the given line, means including the operated impulse actuated devices as well as the tens and units conductors of the wanted telephone line for applying a starting potential to the control anode of the tube in the marking means thereof, and means preventing the operation of the marking means individual to a given telephone line simultaneously in response to a call originated thereon and in response to control effected over the tens and units conductors of the given line.

11. In a telephone system, telephone lines, means individual to each telephone line for generating several series of electrical impulses corresponding to the designation of a wanted telephone line, an impulse-actuated register comprising a separate chain of cold-cathode tubes for each series of impulses of a designation, said chains of cold cathode tubes being actuated in succession in response to the respective series of impulses, each chain of cold cathode tubes being actuated in succession in response to impulses in its respective series in such manner that at the conclusion of all of said series of impulses, only one tube in each chain of cold cathode tubes will be in conducting condition, and means including switching mechanism selectively operated by said register for interconnecting a calling telephone and a designated wanted telephone line, said switching means including a cold cathode line tube individual to the wanted telephone line and having a control electrode operatively connected to and under the joint control of those tubes of said chains of tubes which are in conducting condition.

12. An impulse transmitting and receiving system comprising electric circuit means for transmitting two groups of spaced impulses with a pause between the two groups which is longer than any pause between any two consecutive impulses of the first group, a first impulse counting unit, a second impulse counting unit, means operatively connecting said transmitting means to said first counting unit, switching means including a tube effective upon firing to disconnect said transmitting means from said first counting unit and operatively connect said transmitting means to said second counting unit, said tube including a control electrode effective to cause firing of said tube when a predetermined potential is applied to said control electrode, a first capacitor, a second capacitor, an electrical connection between said second capacitor and said control electrode, and relay means operatively connected to said transmitting means and operated by said impulses for impressing a charging potential on said first capacitor and discharging said second capacitor during transmission of each impulse and for disconnecting said first capacitor from charging potential and connecting it through said resistance to said second capacitor to tend to charge said second capacitor from the charge of said first capacitor during each pause following transmission of each impulse, the respective values of said two capacitors and said resistance being so related to each other and to said charging potential that during the relatively short pauses between consecutive impulses of the first group, said second capacitor does not acquire sufficient charge from said first capacitor to cause firing of said tube, and during the longer pause between the two groups, said second capacitor acquires sufficient charge to cause said control electrode to fire said tube.

13. A construction as defined in claim 12, in which said first capacitor remains disconnected from charging potential and substantially uncharged during any pause preceding transmission of the first impulse of the first group, so that said second capacitor while connected to said first capacitor also remains substantially uncharged during said preceding pause, and said tube does not fire during said preceding pause.

(References on following page)

References Cited in the file of this patent

UNITED STATES PATENTS

| | | |
|---|---|---|
| 2,291,036 | Hall | July 28, 1942 |
| 2,302,334 | Logan | Nov. 17, 1942 |
| 2,317,471 | Meacham | Apr. 27, 1943 |
| 2,326,458 | Hall | Aug. 10, 1943 |
| 2,543,534 | Powell | Feb. 27, 1951 |
| 2,562,100 | Holden | July 24, 1951 |
| 2,609,498 | Bachelet et al. | Sept. 2, 1952 |
| 2,678,409 | Holden | May 11, 1954 |